United States Patent
Kugler et al.

(10) Patent No.: US 10,055,934 B2
(45) Date of Patent: Aug. 21, 2018

(54) MULTI-PLAYER, MULTI-TOUCH GAMING TABLE AND METHOD OF USING THE SAME

(71) Applicant: NOVOMATIC AG, Gumpoldskirchen (AT)

(72) Inventors: Andreas Kugler, Gumpoldskirchen (AT); Andreas Loydold, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 5 days.

(21) Appl. No.: 15/124,501

(22) PCT Filed: Mar. 9, 2015

(86) PCT No.: PCT/EP2015/054819
§ 371 (c)(1),
(2) Date: Sep. 8, 2016

(87) PCT Pub. No.: WO2015/135872
PCT Pub. Date: Sep. 17, 2015

(65) Prior Publication Data
US 2017/0018137 A1    Jan. 19, 2017

(30) Foreign Application Priority Data
Mar. 10, 2014  (EP) .................... 14158687

(51) Int. Cl.
*G06F 3/042*  (2006.01)
*G06K 9/46*   (2006.01)
*G07F 17/32*  (2006.01)

(52) U.S. Cl.
CPC ........ *G07F 17/322* (2013.01); *G07F 17/3206* (2013.01); *G07F 17/3209* (2013.01);
(Continued)

(58) Field of Classification Search
CPC .............................. G06F 3/0304; G06F 3/042
See application file for complete search history.

(56) References Cited

U.S. PATENT DOCUMENTS

| 6,404,904 B1 | 6/2002 | Einighammer et al. |
| 2009/0115133 A1 | 5/2009 | Kelly et al. |

(Continued)

FOREIGN PATENT DOCUMENTS

| CN | 102115953 | 11/2012 |
| CN | 202795228 | 3/2013 |
| CN | 103092437 | 5/2013 |
| EP | 1566729 | 8/2005 |
| EP | 1895483 | 3/2008 |

(Continued)

OTHER PUBLICATIONS

Holz, C. et al. "Fiberio: A Touchscreen that Senses Fingerprints" Oct. 8-11, 2013 ACM-UIST's 13 St. Andrews, UK, pp. 41-50.*
(Continued)

*Primary Examiner* — James S McClellan
*Assistant Examiner* — Syvila Weatherford
(74) *Attorney, Agent, or Firm* — Brooks Kushman P.C.

(57) ABSTRACT

A touch screen player interface includes a fiber optic plate, high-resolution infrared camera and projector. The fiber optic plate acts as a display surface for the output of the projector as well as a fingerprint and/or item scanner. Individual fiber optic plates acting as individual player interfaces or a single fiber optic plate configured to support multiple player interfaces are conceivable. The touchscreen provides an interactive gaming system capable of identifying and authenticating players during common touch interactions. The touch screen interface may be integrated into virtual gaming systems such as virtual roulette, poker and craps systems. Live, human-managed gaming tables may also incorporate the touch screen player interface described herein.

5 Claims, 5 Drawing Sheets

(52) U.S. Cl.
CPC ...... *G07F 17/3225* (2013.01); *G07F 17/3227* (2013.01); *G07F 17/3237* (2013.01); *G07F 17/3248* (2013.01); *G07F 17/3272* (2013.01); *G06F 3/042* (2013.01); *G06K 9/46* (2013.01)

(56) References Cited

U.S. PATENT DOCUMENTS

| | | | |
|---|---|---|---|
| 2009/0124379 A1* | 5/2009 | Wells | G07F 17/32 463/31 |
| 2009/0143141 A1 | 6/2009 | Wells et al. | |
| 2010/0113140 A1 | 5/2010 | Kelly et al. | |
| 2011/0263326 A1 | 10/2011 | Gagner et al. | |
| 2012/0329553 A1 | 12/2012 | Gagner et al. | |
| 2015/0160784 A1* | 6/2015 | Wilson | G06K 9/00355 345/175 |

FOREIGN PATENT DOCUMENTS

| | | |
|---|---|---|
| EP | 2469489 | 6/2012 |
| JP | 2008210230 | 9/2008 |
| JP | 2009069981 | 4/2009 |
| RU | 2185096 | 7/2002 |
| WO | 2007021249 | 2/2007 |
| WO | 2007081856 | 7/2007 |

OTHER PUBLICATIONS

International Search Report for PCT/EP2015/054819, Completed by the European Patent Office on Jun. 5, 2015, 4 Pages.

European Search Report for European Application No. EP 14158687, Completed by the European Patent Office on Aug. 5, 2014, 2 Pages.

* cited by examiner

MULTI-PLAYER, MULTI-TOUCH GAMING TABLE AND METHOD OF USING THE SAME

CROSS-REFERENCE TO RELATED APPLICATION

This application is the U.S. national phase of PCT Application No. PCT/EP2015/054819 filed on Mar. 9, 2015, which claims priority to EP Patent Application No. 14158687.5 filed on Mar. 10, 2014, the disclosures of which are incorporated in their entirety by reference herein.

FIELD OF THE INVENTION

The embodiments of the present invention relate to a gaming table incorporating one or more touch screens configured to act as player interfaces and biometric identifiers of a player for security, tracking and related purposes.

BACKGROUND

Casino gaming comes in two general forms, namely live games of chance involving a human dealer (e.g., blackjack) and electronic games of chance (e.g., slot machines). Many live games of chance are also offered in electronic form. For example, blackjack is offered as a live game of chance as well as via an electronic gaming machine configured to conduct a blackjack game. Moreover, given limited floor space, many electronic games of chance utilize a single gaming machine with multiple player interfaces to accommodate multiple players. For example, some virtual roulette gaming tables are fully automated and include multiple player stations each including a player interface configured to allow a player to cash in, place wagers and cash out.

Over the years certain innovations have become ubiquitous in the gaming industry. Player tracking is one such innovation that has changed the gaming industry. By tracking the play of players, casinos are now able to direct market to individual players based on their play. Player tracking has routinely involved the use of a player card having a magnetic data strip and a card reader configured to read the magnetic card. A central, software-based system is used to collect and maintain data from play of individual players. Normally, the data is stored in a database including individual player files.

While the aforementioned player tracking systems have worked well, it would be advantageous to develop a new system for tracking play. It would also be beneficial if the system acted as a player interface to the subject game and further authenticated player identities.

SUMMARY

The embodiments of the present invention are generally directed to a gaming table including one or more touch screen player interfaces configured to identify players biometrically, based on fingerprints, repeatedly during each touch interaction between a player and the touch screen interface. In addition, other items comprising for instance fiducial markers may be tracked repeatedly during each touch interaction with the touch screen interface.

In one embodiment, the touch screen player interface comprises broadly a fiber optic plate, a (preferably high-resolution infrared) camera and a projector. The fiber optic plate acts as a display surface for the output of the projector as well as a fingerprint and/or item scanner/reader. Images from the projector are projected onto the bottom side of said fiber optic plate, which creates a touch screen interface for the players on its top side; the camera captures images from the bottom side of the fiber optic plate, said image comprising touch information being associated with touch interactions (fingerprints or items) with the top side of said fiber optic plate. Such a touch screen provides an interactive gaming system capable of identifying and authenticating players during common touch interactions.

In one embodiment, a virtual roulette gaming system comprises an automated roulette wheel and multiple player stations wherein each player station includes a touch screen configured to act as a player interface while simultaneously identifying a player via the player's fingerprints. Thus, in such an embodiment, the touch screen permits a player to place roulette wagers and collect winnings while authenticating the player for security and tracking purposes. The embodiments of the present invention are suitable for any virtual or live gaming table.

In one embodiment, a virtual roulette gaming system comprises an automated roulette wheel and a single touch screen configured to act as a multi-player interface while substantially simultaneously identifying a number of players via the respective player's fingerprint(s) and providing a variable positioned player-interface for each respective player depending on the respective player's position of the fingerprint(s) on the touch screen.

Other variations, embodiments and features of the present invention will become evident from the following detailed description, drawings and claims.

DETAILED DESCRIPTION

Figure 1:
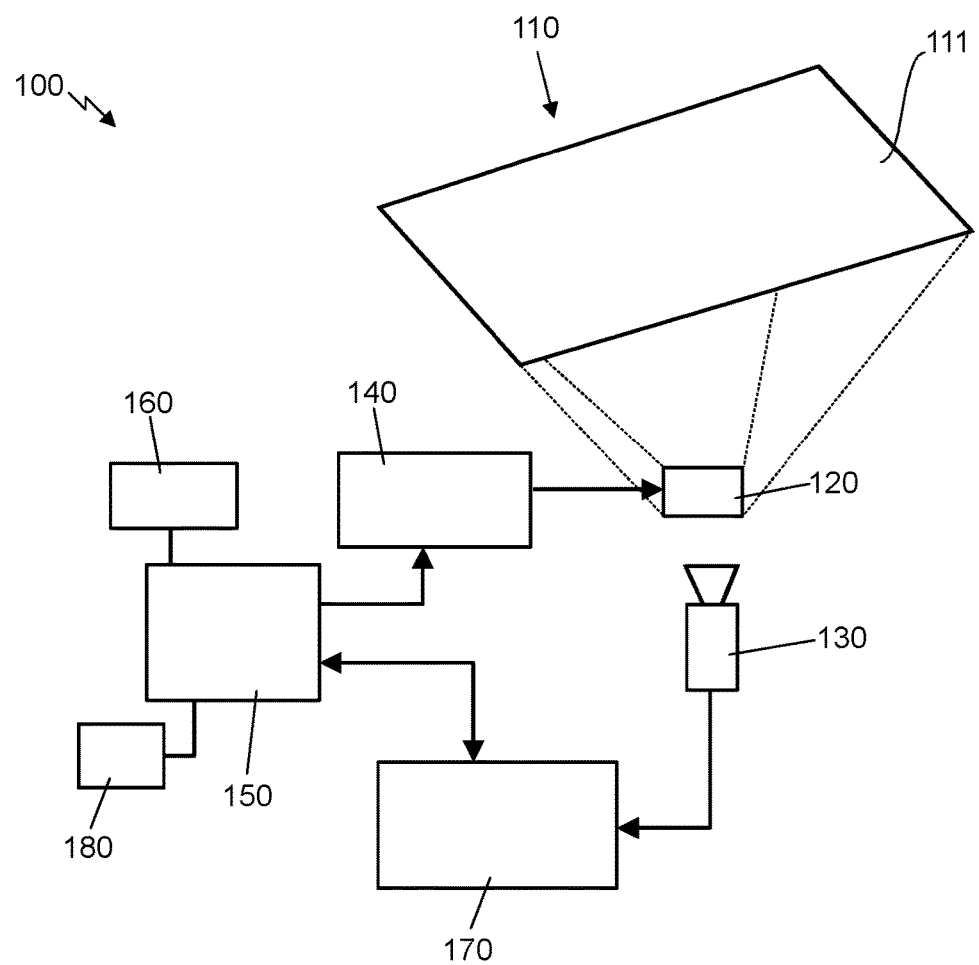
FIG. 1 illustrates a block diagram of a touch screen according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "gaming machine" or "gaming device" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

FIG. 1 shows a block diagram of a touch screen system 100 according to the embodiments of the present invention. The touch screen system 100 comprises a fiber optic plate 110, projector 120 and infrared camera 130. In an embodiment a hot mirror in front of the projector 120 may prevent interference with the camera 130. The hot mirror may be specialized dielectric mirror, a dichroic filter, reflecting infrared light back into a light source, while allowing visible light to pass. The hot mirror may be designed to be inserted into the optical system at an incidence angle varying between zero and 45 degrees. The projector 120 receives instructions from a video adapter 140 or video card in communication therewith. The video adapter 140 may contain its own memory and/or processing power. Regardless, a separate processor 150 controls the video adapter 140 and other components of the touch screen system 100. The processor 150 may also have, or communicate with, memory 160. The infrared camera 130 communicates with a software-based, fingerprint recognition module 170 also controlled by processor 150. In one embodiment, a single processor controls multiple touch screen systems 100 at a gaming table. Regardless of the number of processors, certain inputs/outputs 180 thereof allow additional devices to be connected thereto.

The fiber optic plate 110 acts as the touch screen interface for the player or players. The fiber optic plate 110 includes a plurality of glass fibers having comparatively extremely small diameters (e.g., 6 μm). In one embodiment, the numerical aperture of the glass fibers is 1.0 and the refractive index of their core is 1.8 and that of the cladding is 1.49. In one embodiment, the fiber optic plate 110 blurs all or most incident light thus acting as a light diffuser by scattering light in all directions. Such diffusion properties facilitate the fiber optic plate 110 receiving and displaying projected output from the projector 120 thereunder. In addition to acting as a light diffuser, the fiber optic plate 110 reflects light from above producing the contrast necessary for fingerprint reading and scanning In one embodiment, there are millions of optical glass fibers arranged to run substantially perpendicular to the touch surface of the fiber optic plate 110 and transmit light between the top (i.e. the touch surface) and bottom (i.e. the side where the projector 120 projects images and the camera 130 is directed) of the fiber optic plate (i.e., screen) 110. Such fiber optic plates are often marketed for shielding CCD sensors from X-ray radiation in medical applications. In one embodiment, a projected pixel may cover a multitude of fibers. In another embodiment, to extend the touch screen for larger sizes, the system may use an array of high-resolution cameras or use a single camera and a high-speed pan and tilt mirror.

The fiber optic plate 110 also captures, via the infrared camera 130 or other image capturing device, player's fingerprints responsive to a player touching an upper surface (top side) 111 thereof. In one embodiment, fingerprints are read or scanned by evaluating fingerprint elevations in contact with the upper surface 111 which appear darker than brighter fingerprint valleys and hovering finger areas not in contact with the upper surface 111. Besides finger parts not in contact with the fiber optic plate 110 (i.e., hovering), the touch screen system 100 may also recognize fiducial markers attached to tangible objects (items) interacting with the fiber optic plate 110. In one embodiment, fiducial markers in a size range of 1 mm$^2$ to 5 mm$^2$ may be recognized.

Figure 2:
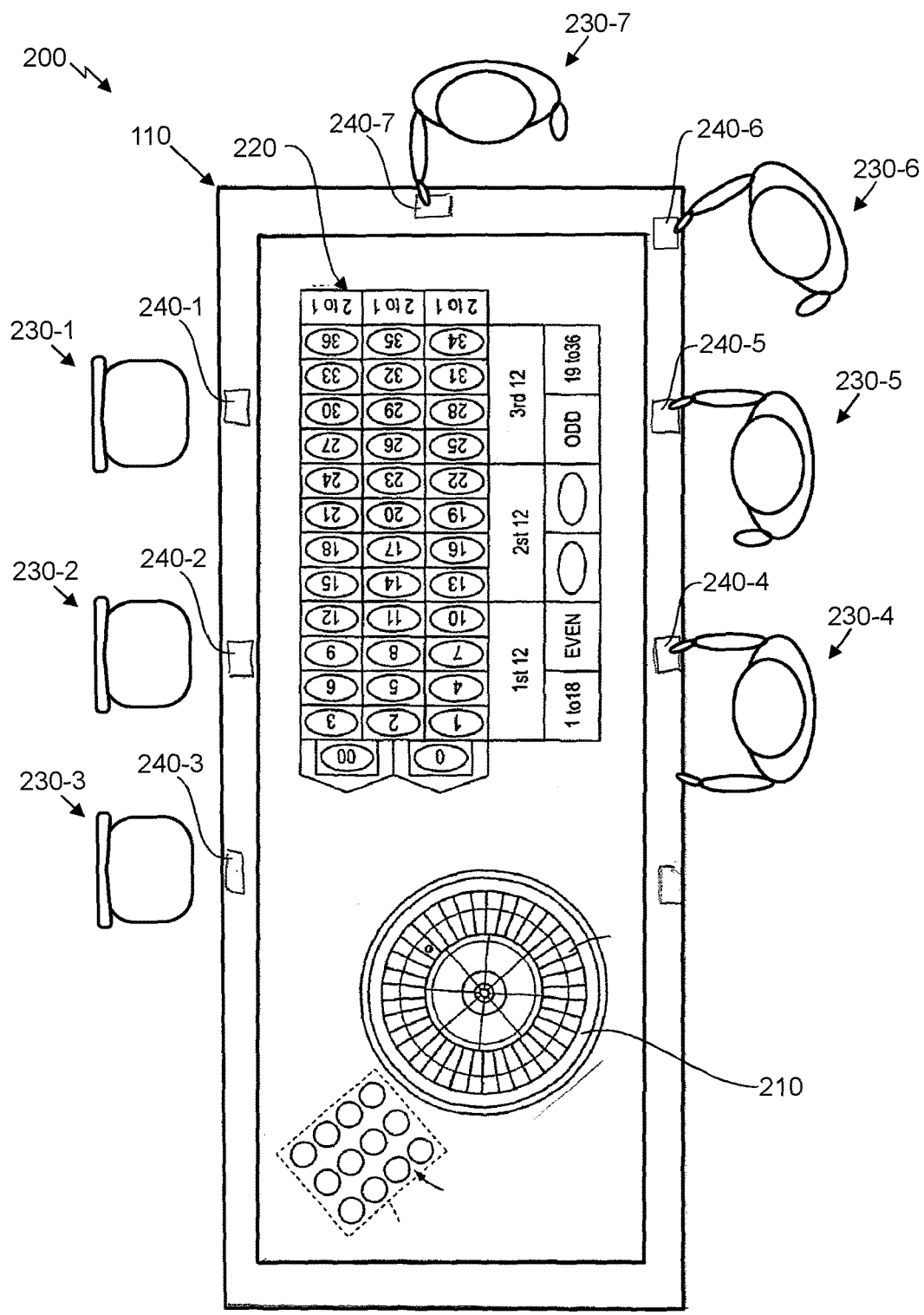
FIG. 2 illustrates an overhead view of a virtual roulette gaming system according to the embodiments of the present invention.

FIG. 2 shows a virtual roulette gaming system 200 utilizing multiple touch screen systems as described herein. As shown, the virtual roulette gaming system 200 includes an automated or human operated roulette wheel 210, electronic digital layout 220, fixed player stations 230-1 through 230-3, variable player stations 230-4 through 230-7, and associated player interfaces 240-1 through 240-7. Each player interface 240-1 through 240-7 is synonymous with a touch screen system 100. While seven player stations 240-1 through 240-7 are shown, those skilled in the art will recognize that more or less player stations are conceivable. Virtual roulette gaming systems 200 are known in the art such their operation need not be disclosed herein. For example, Novomatic AG, based in Austria, manufactures and sells virtual roulette gaming systems as well as other multi-player gaming systems which may utilize the embodiments of the present invention.

Figure 3:
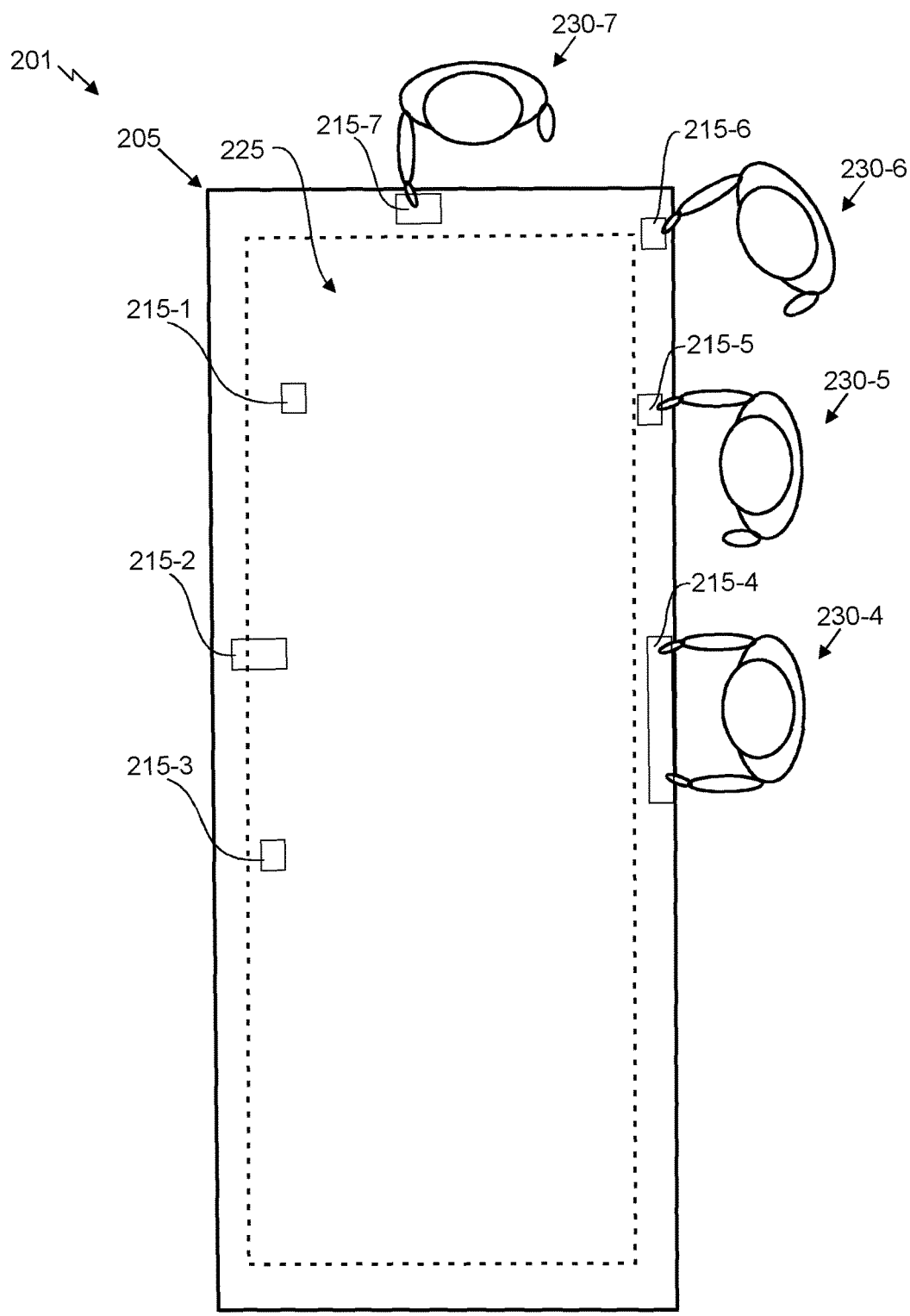
FIG. 3 illustrates an overheard view of a virtual roulette gaming system according to the embodiments of the present invention.

FIG. 3 shows a virtual gaming system 201 utilizing a single fiber optic plate 205, one or more projectors and image capturing devices which create multiple individual player interfaces 215-1 through 215-7 on said single fiber optic plate 205. The digital layout 225 may also be depicted on (the bottom side of) the fiber optic plate 205 by the projector 120. The digital layout 225 may be a virtual roulette or poker or craps game or any other suitable game like for instance a community game. With this embodiment, individual player interfaces 215-1 through 215-7 are created on the fiber optic plate 205 based on coordinates where a player touches the fiber optic plate 205 to log on to the system.

Figure 4:
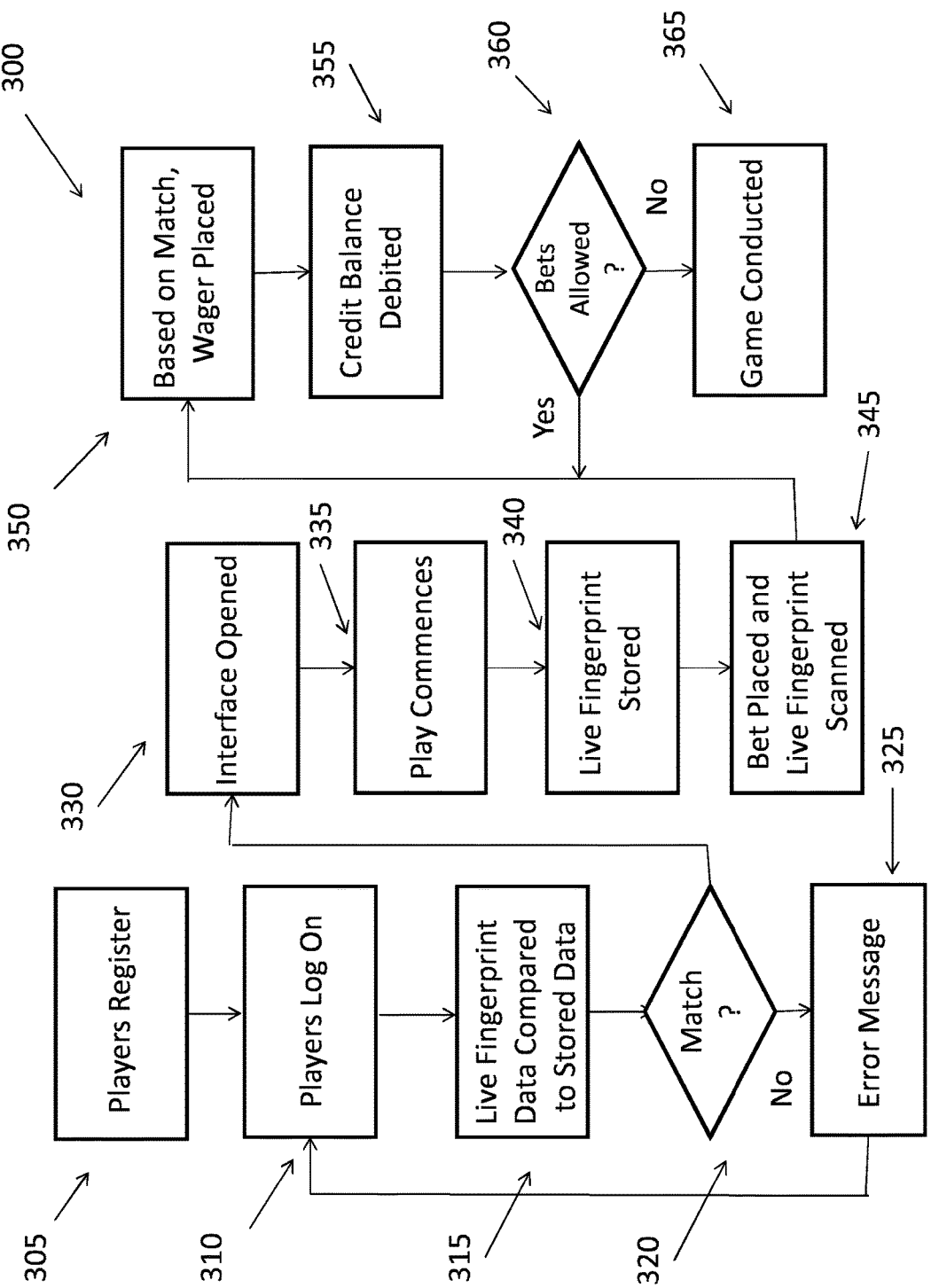
FIG. 4 illustrates a flow chart detailing one methodology for utilizing the system according to the embodiments of the present invention.

FIG. 4 shows a flow chart 300 detailing one methodology for operating the virtual roulette gaming system 200. At step 305, a player registers with a casino or operator. The registration may include the player providing personal information including one or more fingerprints. Novomatic AG produces and sells its Novomatic Biometric System which may be used to acquire and store the registering player's fingerprint. The fingerprints may be stored locally or remotely at a central location in communication with multiple commonly owned casino properties. Other fingerprint systems may be used as well. At step 310, a registered player logs on to the virtual roulette gaming system 200 by touching the top side 111 of the fiber optic plate 110 associated with a player interface 240-1 and 240-7 located at one of the player stations 230-1 through 230-7. The infrared camera 130 acquires an image from the bottom side of the fiber optic plate 110. The said acquired image may comprise fingerprint information of a players touch interaction on the top side 111 of the fiber optic plate 110, from which image the software-based fingerprint recognition module 170 extracts live fingerprint data for comparison with stored fingerprint data. The software-based fingerprint module 170 renders the fingerprint data/information acquired by the infrared camera 130 suitable for comparison with stored fingerprint data by, for example, capturing the key points of the live fingerprint for comparison with stored fingerprints. For obvious reasons, the fingerprint(s) used to log on to the virtual roulette gaming system 200 needs to be the same fingerprint(s) provided during the registration process. At step 315, the live fingerprint data is compared with stored fingerprint data to locate a match. The live fingerprint data may be compared to a complete database of stored fingerprints or a smaller database based on a single property. Communications between the virtual roulette gaming system 200 may utilize a secure, encrypted wireless system or wired system, both of which are known in the art. At 320, it is determined if a fingerprint match has been located. If not, at 325, an error message is initiated on the player interface 240-1 through 240-7 allowing the player to repeat the log on procedure or register if the player has not already done so. If a fingerprint match is located or verified, at step 330, a personal virtual interface is opened and depicted on the fiber optic plate 110 via the projector 120. In one embodiment, the interface depicts virtual chips of various denominations (e.g., $1, $5 and $10) and a player account balance. According to one embodiment, if a fingerprint match is located or verified, at step 330, a personal virtual interface is opened and depicted via the projector 120 at a position on the single fiber optic plate 110 determined by (i.e., depending on) the coordinates of the touch position of the fingerprint on the fiber optic plate 110. A central player file unique to the registered player may also be opened to maintain data associated with the upcoming gaming session. At this stage, the system has authenticated the identity of the player and the location, based on the player interface 240-1 through 240-7 being touched, of the player at the virtual roulette gaming system 200. At step 335, play commences with the player touching the player interface 240-1 through 240-7 to select a chip denomination. As the player's identity has been authenticated and location established, the player may use any finger to interact with the player interface 240-1 through 240-7. At step 340, the fingerprint of the finger used to select the chip denomination is acquired and stored in volatile memory 160 and associated with the previously identified player and value of the selected chip denomination based on touch location. According to one embodiment, a two-hand approach may be implemented, which comprises a touch interaction of the registered finger of one hand of the player being continuously monitored for presence on the touch screen and, at step 340, the fingerprint of one of the fingers of the other hand of the player is used to select the chip denomination and is acquired and stored in volatile memory 160 and associated with the identified player and value of the selected chip denomination based on touch location. According to another embodiment, different fingers may be used for different denominations. At step 345, the player touches the electronic digital layout 220 to make a virtual bet in accordance with the chip denomination and the electronic digital layout 220, being a fiber optic plate, captures the player's fingerprint again and compares it to the fingerprint in volatile memory 160 from step 340. At step 350, based on a match, the chip denomination selected at step 335 is used to place the wager. At step 355, a credit balance associated with the player and depicted on the player interface 240-1 through 240-7 is debited the amount of the placed wager. This wagering procedure is repeated as the player continues placing wagers prior to a warning of "no more bets" from a virtual or human croupier at step 360. At step 365, the game is conducted and wagers are collected or paid.

Figure 5:
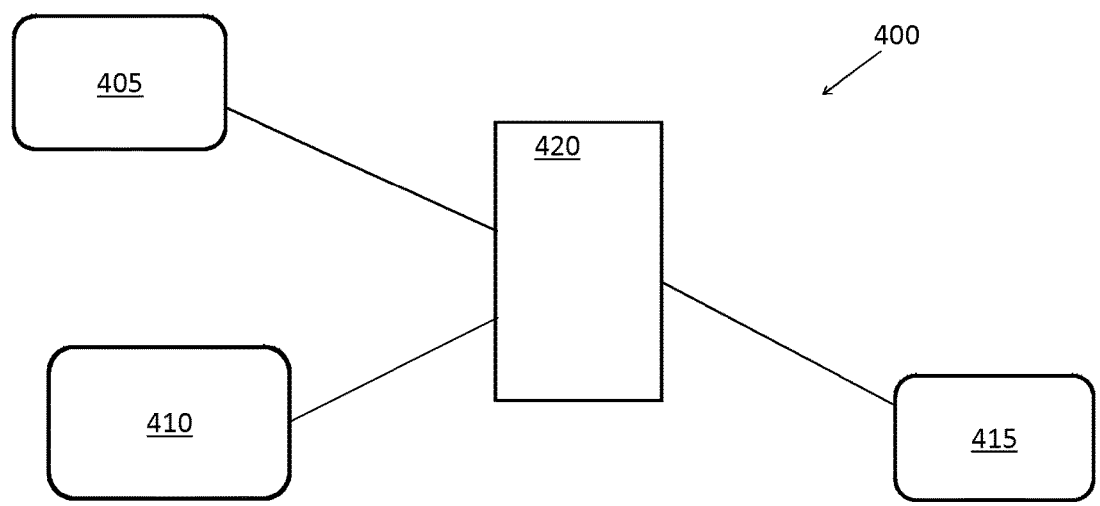
FIG. 5 illustrates a block diagram of a multi-table gaming system according to the embodiments of the present invention.

FIG. 5 shows a block diagram of a networked gaming system 400 including multiple virtual gaming systems such as a roulette gaming system 405, poker gaming system 410 and craps gaming system 415, wherein each of the virtual gaming systems include one or more touch screen systems 100. While three gaming systems 405-415 are shown, it is understood that more or less gaming systems may form part of the network. Indeed, virtual and live gaming tables may both form part of a networked gaming system. Each virtual gaming system 405-415 communicates wirelessly or, via a wired connection, with a central server 420 maintaining a database of player files and associated fingerprint data which are accessed responsive to registered players' identities being authenticated via the touch screen systems 100 as described above. The player file is updated after gaming sessions conclude. Such updates may include amounts wagered, won, lost, time played and the like.

Figure 6:
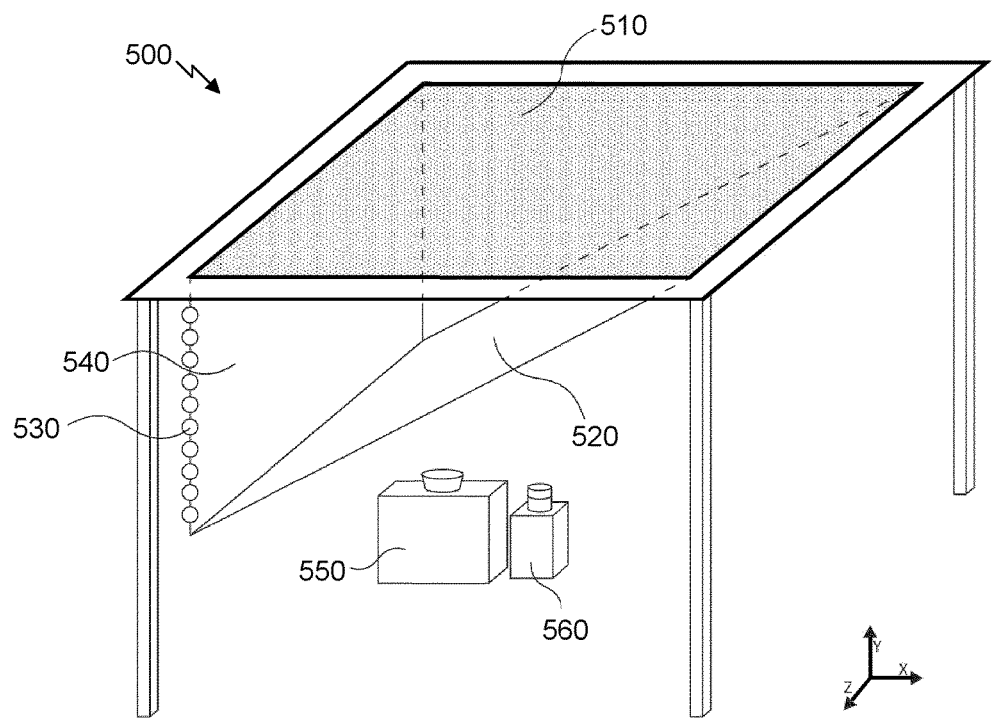
FIG. 6 illustrates a cross-sectional view of a gaming table with a single fiber optic plate according to the embodiments of the present invention.

FIG. 6 shows a cross-sectional view of a gaming table 500 with a single fiber optic plate 510 according to the embodiments of the present invention. In this embodiment, the fiber optic plate 510 creates a frustrated Fresnel reflection. A semi-transparent (half-silvered) mirror 520 is arranged in the beam-path of the infrared camera 560 and a light source (e.g., LEDs) 530, which may be an infrared light source, arranged to direct its light via the semi-transparent mirror 520 to the fiber optic plate 510. In other words, the light source(s) 530 or area illuminant 540 shines light at the entire fiber optic plate 510 from below while the camera 560 is placed so as to capture the reflected light coming back down the fibers. The projector 550 may be positioned proximate to the camera 560.

Figure 7:
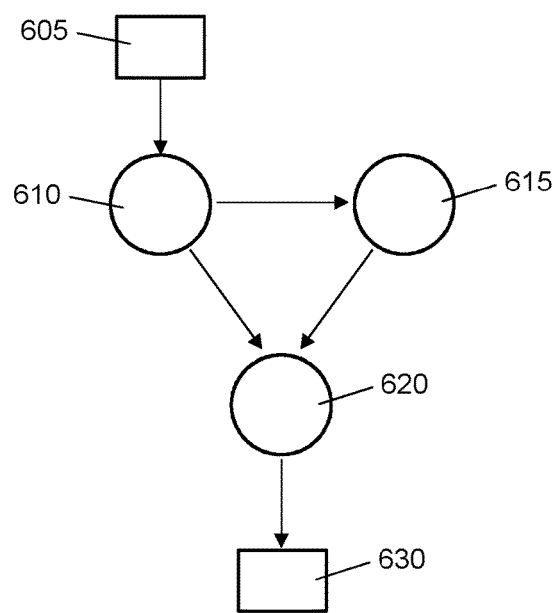
FIG. 7 illustrates an operational diagram of a single fiber optic plate system configured to create individual player interfaces thereon according to the embodiments of the present invention.

FIG. 7 shows an operational diagram 600 of a single fiber optic plate system configured to create individual player interfaces thereon according to the embodiments of the present invention. At step 605, the camera captures an image from the bottom side of the fiber optic plate and at step 610 the software-based, fingerprint module extracts a suitable fingerprint. At 615, the players' identities are authenticated using the acquired live fingerprint data as matched with stored fingerprint data. At 620, from touch interaction time and position and player identity, a touch event is generated to be provided to a further application 630, like for instance the roulette gaming application where such information may be used for instance for placing (indicating) specific chip denominations at specific area of the table layout.

According to one embodiment there is provided a gaming system network comprising: a plurality of gaming tables each including one or more player interfaces, each player interface comprising: a fiber optic plate;
　a projector configured to project images onto said fiber optic plate creating a player interface;
　an image capturing device for capturing fingerprint data associated with touch interactions with said fiber optic plate and/or for capturing fiducial markers of items associated with moving actions on the said fiber optic plate; and
　means respectively an electronic interface for communicating with memory having stored fingerprint data, wherein fingerprint data acquired by said image capturing device may be compared to stored fingerprint data and being used for interaction with the player interface.

The said gaming system network may further comprise that in each player interface further comprises an image capturing device for capturing fiducial markers of items associated with moving actions on said fiber optic plate and means for communicating with memory having stored fiducial markers, wherein fiducial markers acquired by said image capturing device may be compared to stored fiducial markers and used for interaction with the player interface.

The gaming system network may further comprise that said fiber optic plate acts to diffuse and reflect light for purposes of projecting information and scanning fingerprint data/information, respectively.

The gaming system network may further comprise a video adapter in communication with each said projector.

The gaming system network may further comprise that said projected images include chip denominations and account balances.

Although the invention has been described in detail with reference to several embodiments, additional variations and modifications exist within the scope and spirit of the invention as described and defined in the following claims.

The invention claimed is:

1. A gaming method comprising:
　acquiring touch information at a gaming table via a touch screen interface for players, said gaming table at least comprising a fiber optic plate having a top side and bottom side, at least one projector and at least one image capturing device;
　projecting information via said projector onto the bottom side of said fiber optic plate said fiber optic plate creating a touch screen interface for the players on the its top side;
　capturing an image from the bottom side of the fiber optic plate via said at least one image capturing device, said captured image comprising touch information being associated with touch interactions with said fiber optic plate;
　comparing said captured touch information with stored touch data;

acquiring fingerprint data of potential players;

storing in a central server said fingerprint data;

wherein the touch information comprises a player's fingerprint information and the touch data stored in the memory comprises fingerprint data;

rendering the fingerprint information acquired by the at least one image capturing device suitable for comparison with stored fingerprint data;

comparing said acquired fingerprint information with stored fingerprint data; and if a match occurs between said acquired fingerprint information with stored finger print data, projecting information via said at least one projector onto said fiber optic plate creating individual player interfaces on said fiber optic plate based on coordinates where each player's fingerprint is positioned on said fiber optic plate; and continuously monitoring fingerprint information of one hand of a player while a finger from the second hand of the player interacts with the fiber optic plate.

2. The gaming method of claim 1 further comprising acquiring fingerprint information during each touch interaction with said fiber optic plate.

3. The gaming method of claim 1 further comprising projecting images including chip denominations and account balances.

4. The gaming method of claim 1 further comprising configuring said player interfaces to recognize at least one of the following: hovering items and fiducial markers.

5. The gaming method of claim 1 further comprising (i) capturing fiducial markers of items associated with moving actions on said fiber optic plate, (ii) communicating with memory having stored fiducial markers, and (iii) comparing captured fiducial markers with stored fiducial markers.

\* \* \* \* \*